Figure 1:
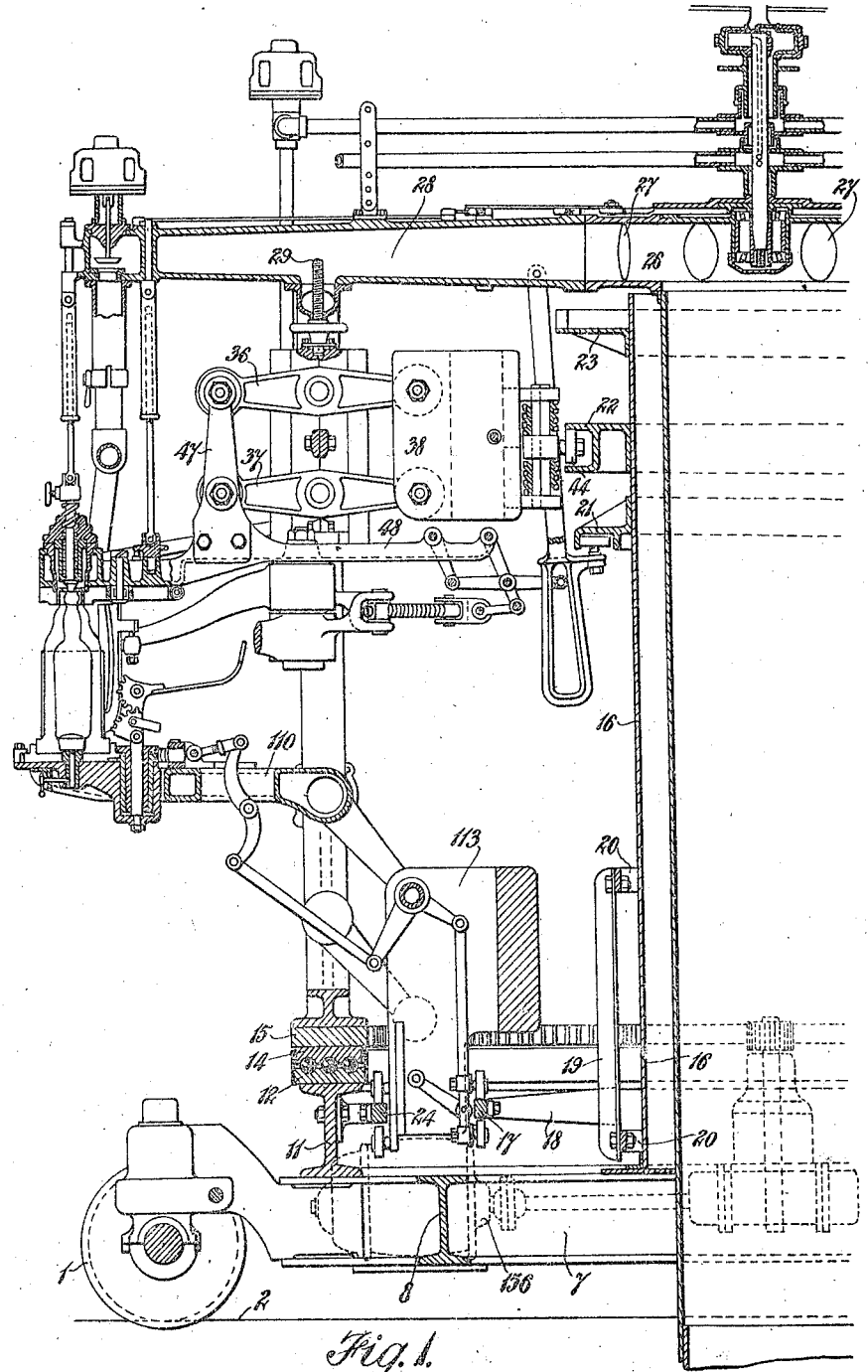

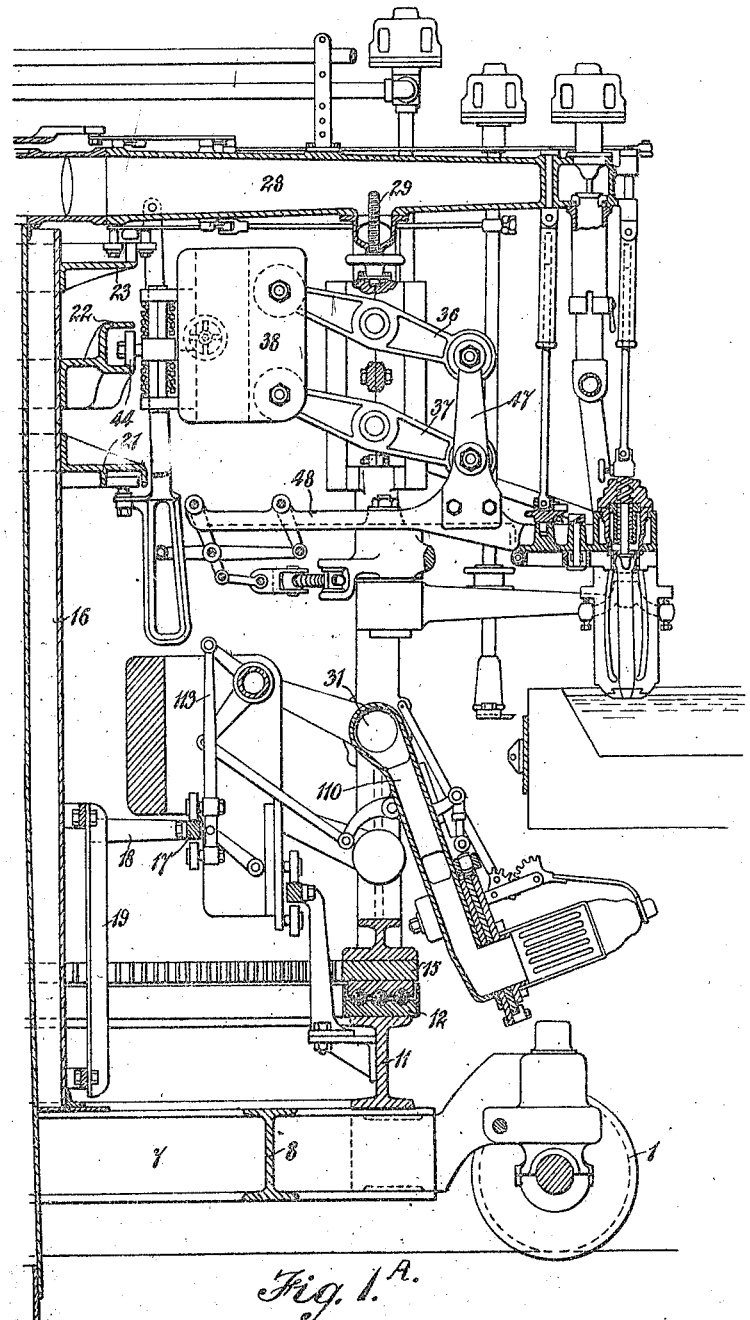
Fig. 1.ᴬ

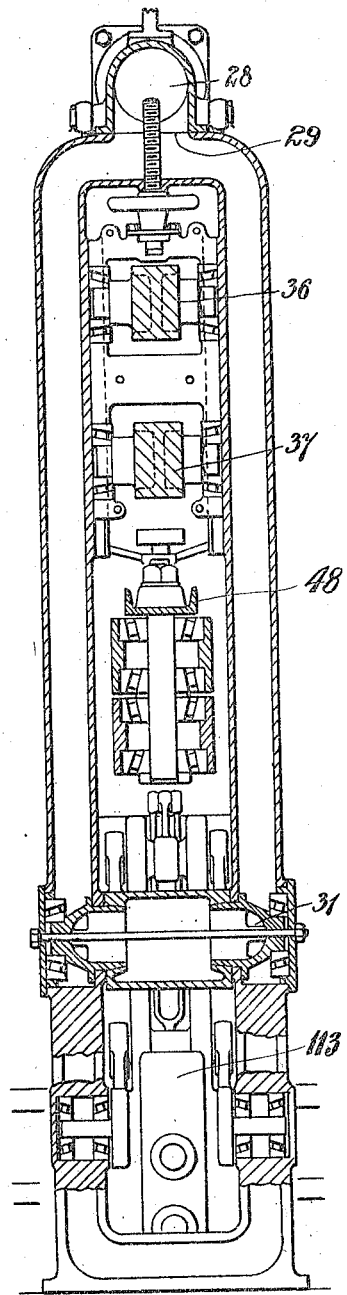

Patented July 1, 1924.

1,499,523

UNITED STATES PATENT OFFICE.

ROBERT FREDERICK HALL, OF MOSELEY, NEAR BIRMINGHAM, ENGLAND.

MACHINE FOR THE MANUFACTURE OF GLASS ARTICLES.

Original application filed March 13, 1918, Serial No. 222,257. Divided and this application filed July 27, 1920. Serial No. 399,428.

(GRANTED UNDER THE PROVISIONS OF THE ACT OF MARCH 3, 1921, 41 STAT. L., 1313.)

*To all whom it may concern:*

Be it known that I, ROBERT FREDERICK HALL, a subject of the King of Great Britain and Ireland, and residing at Moseley, near Birmingham, in the county of Warwick, England, have invented certain new and useful Improvements in Machines for the Manufacture of Glass Articles (for which I have filed an application in Great Britain, No. 9922, filed July 10, 1917), of which the following is a specification.

This invention relates to rotary machines for the manufacture of glass articles, and refers more particularly to a construction, whereby I am enabled to assemble a machine with great rapidity and facility, as well as to remove or replace any of the unit parts as desired.

The general principle of the invention consists in constructing the machine from a number of units, each of which carries all the necessary mechanisms, or a considerable portion of such mechanisms, for forming a glass article such for instance as a bottle.

In carrying out my invention I form the machine for manufacturing glass articles with an upper rotatable member or fitting, connected to a lower rotatable ring or its equivalent, by a suitable number of separate and distinct units, each unit carrying a parison mould and a finishing mould, or other device for finishing the article and the mechanisms for operating or transmitting motion to the moulds or device, the construction being such that each unit can be readily removed from or placed in position in the machine without disturbing the mounting of the moulds and associated parts in each unit.

In some cases the unit may comprise a single elongated loop, in which is mounted a parison mould and a finishing mould together with their associated parts. In other cases each unit may comprise two separate loops, one at a higher level, carrying the parison mould and its associated parts, and the other at a lower level carrying the finishing mould and its associated parts, the two loops together forming a composite elongated loop.

In order that my said invention may be more clearly understood, I will now proceed to describe the same as applied to a machine of the Owens type for the manufacture of hollow glass articles with reference to the accompanying drawing, in which:—

Fig. 1 is a sectional elevation of one half of the machine, the plane of section being broadly speaking diametrical with respect to the framework and the associated mechanisms.

Fig. 1$^A$ is a similar view, on the same diameter, of the other half of the machine.

Fig. 1$^F$ is a transverse section through one of the bifurcated columns constituting a unit.

The same numerals of reference are employed to denote the same parts in all the views.

In the following description the details of the machine which are not immediately connected with the present invention are briefly considered, in order to enable the general construction of the machine to be understood, but they will be found described in greater detail in my co-pending application, Serial Number 399,427, filed July 27, 1920, for machines for manufacturing glass articles.

The machine is supported upon wheels 1, adapted to run upon rails 2 in the neighbourhood of the furnace, in the ordinary manner.

These wheels support the main lower framework of the machine which is composed of longitudinally disposed girders 7, connected by transverse girders 8.

The girder framework 7, 8, carries a ring 11, which in turn carries a channelled ring 12, forming the lower member of a ball bearing. 14 is another ring forming the upper member of the ball bearing and to this latter is attached an internally toothed annulus 15.

Suitably supported upon the lower girder framework 7, 8 is a vertical column 16, carrying the principal non-rotatable parts of the machine.

These parts comprise.—

A large cam 17 carried by brackets 18, connected in turn to vertical struts 19, carried by brackets 20 upon the column 16

Another cam, in this case a horizontal cam 21, at a higher level.

A vertical cam 22 for raising and lowering the parison mould.

A horizontal cam 23 near the top of the column.

24 is another cam carried by suitable brackets on the fixed framework of the machine.

At the top of the machine, is a chamber 26 provided on the outside with a number of projecting faces each having a circular aperture 27 formed therein.

Bolted to each of the faces and opposite one of the apertures 27 is a hollow arm 28 which extends radially from the said chamber. Each radial arm is closed at the end, but provided with an aperture 29 for the purposes hereinafter explained.

Bolted between each one of the radial arms 28 and the annulus 15 is a column or framework, hereinafter termed "the bifurcated column" and it will be seen that when all the bifurcated columns are in position, they carry the chamber 26 through the intervention of the radial arms 28, and that the whole rotatable super-structure of the machine is carried by the bearing ring 14.

The columns are formed from castings of H section at the lower part and solid up to the height of the trunnions 31, from which position to the top they are hollow, so that when each unit or bifurcated column is in position, the interior of the side frames of the column is in communication through the corresponding arm and aperture 27 with the interior of the chamber 26.

The upper part of the bifurcated column carries the parison mould and its associated mechanisms, which need not be described in detail, as they form no part of the present invention.

In the form illustrated in the drawing, the mechanism for carrying each parison mould comprises two parallel levers 36 and 37 connected at their inner ends to the weights 38, the movement of which is controlled by a roller 44 working in the cam 22, the parison mould sections being carried by a casting 48 from a link 47 to which the outer ends of the levers 36 and 37 are pivoted.

The constructional details in connection with the lower portion of each of the bifurcated columns have also no immediate reference to my present invention, so that it is only necessary to consider them very briefly.

110 is a casting carried by the trunnions 31, and constituting a swinging table controlled by a parallel link motion from the weight 113, which is in turn controlled from the double acting cam ring 24.

The swinging table carries the finishing or blowing moulds and the mechanisms for operating and closing the same.

It is not thought necessary, in the present specification to consider the general operation of the machine, which is fully explained in the previously mentioned copending application, but the advantages of the unit system of construction will be briefly considered.

As has already been explained each bifurcated column carries a parison mould and its associated parts and also a finishing mould and its associated parts, so that all the important mechanisms in connection with the manufacture of a glass article are carried by the column. Consequently by detaching any one of the arms 28 from the corresponding face of the chamber 26 and unbolting the lower end of the corresponding bifurcated column from the annulus 15, the whole unit, may be quickly removed, taking with it the moulds and associated parts and the rods mounted on the arm 28.

In this way should one of the units break down for any reason, it can be quickly removed and replaced by another unit, or if no unit is available, it is only necessary to close the corresponding aperture 27, and the machine will continue to work without the unit.

This unit system greatly cheapens and facilitates the manufacture, as it enables the unit to be constructed away from the machine and placed in position when complete. It also makes repairs economical and simple and makes it rarely necessary to stop the whole machine for any considerable time.

It will be understood that the methods of construction may be varied considerably.

For instance, in place of forming the units in the shape of columns, which are hollow for the purpose of conducting air, I may form the units of solid loops or frames, carrying the parison mould and associated parts at an upper level, and the finishing mould or its equivalent and associated parts at a lower level.

In other cases the loop may comprise two parts, one at an upper level carrying for instance the parison mould and its associated mechanisms and another at a lower level carrying the finishing mould or its equivalent and its associated mechanisms.

This application is a division of my application Serial No. 222,257, filed Mar. 13, 1918.

I claim—

1. A machine for the manufacture of glass articles comprising a stationary frame, a rotatable frame supported thereon, said rotatable frame including an upper member having a plurality of laterally extending radial arms, and a lower member, a removable vertical column interposed between each radial arm and the lower member and connected therewith, each of said columns having a vertically elongated opening therein, a parison mold supporting frame journaled in means in the elongated opening, a parison mold thereon, a finishing mold carrying frame journaled in the elongated opening, a finishing mold carried thereby and means for effecting the actuation of the parison and finishing molds, the arrangement being such the when one of the columns is removed, the parison and finishing molds and their associated parts may also be removed independently of the similar parts carried by the other columns.

2. In a machine for the manufacture of glass articles, the combination of an upper rotatable hollow chamber, a lower rotatable member, and a number of detachable glass article making units, each comprising an elongated loop, the said loop being hollow and in communication with the upper hollow chamber and with a source of supply for air, lever mechanism at an upper level pivoted to the said loop, and carrying a parison mold and its associated parts, lever mechanism at a lower level pivoted by means of hollow trunnions to the said elongated loop and carrying a finishing mold and its associated parts, and means for supplying the air passing down the hollow loop and through the trunnions to the finishing mold and associated parts, substantially as described.

3. In a machine for the manufacture of glass articles, the combination of an upper rotatable hollow chamber, in communication with a source of air supply, said chamber being provided with a polygonal periphery a lower rotatable member and removable glass article making units, each of said units comprising an elongated hollow loop, connected at the top by a hollow arm with an aperture in one of the faces of the polygonal chamber, a lever mechanism pivoted at an upper level in the elongated loop and carrying the parison mold and its associated parts, and a lever mechanism pivoted at a lower level by means of hollow trunnions to the hollow loop, such last mentioned lever mechanism carrying a finishing mold and its associated parts and being provided with means for supplying air passing from the hollow trunnions to the molds and parts to be cooled, substantially as described.

In testimony whereof I have hereunto subscribed my name.

ROBERT FREDERICK HALL.